UNITED STATES PATENT OFFICE.

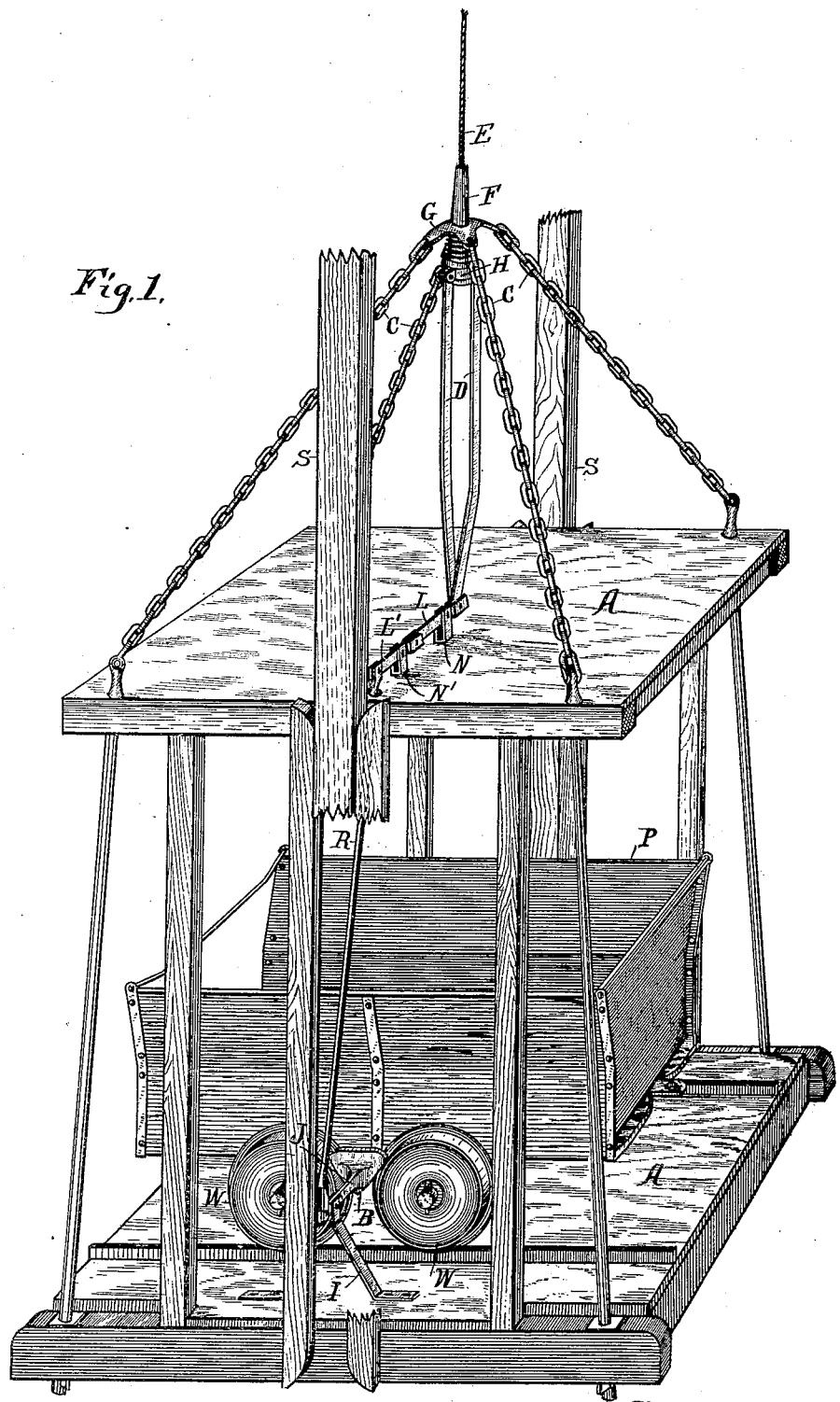

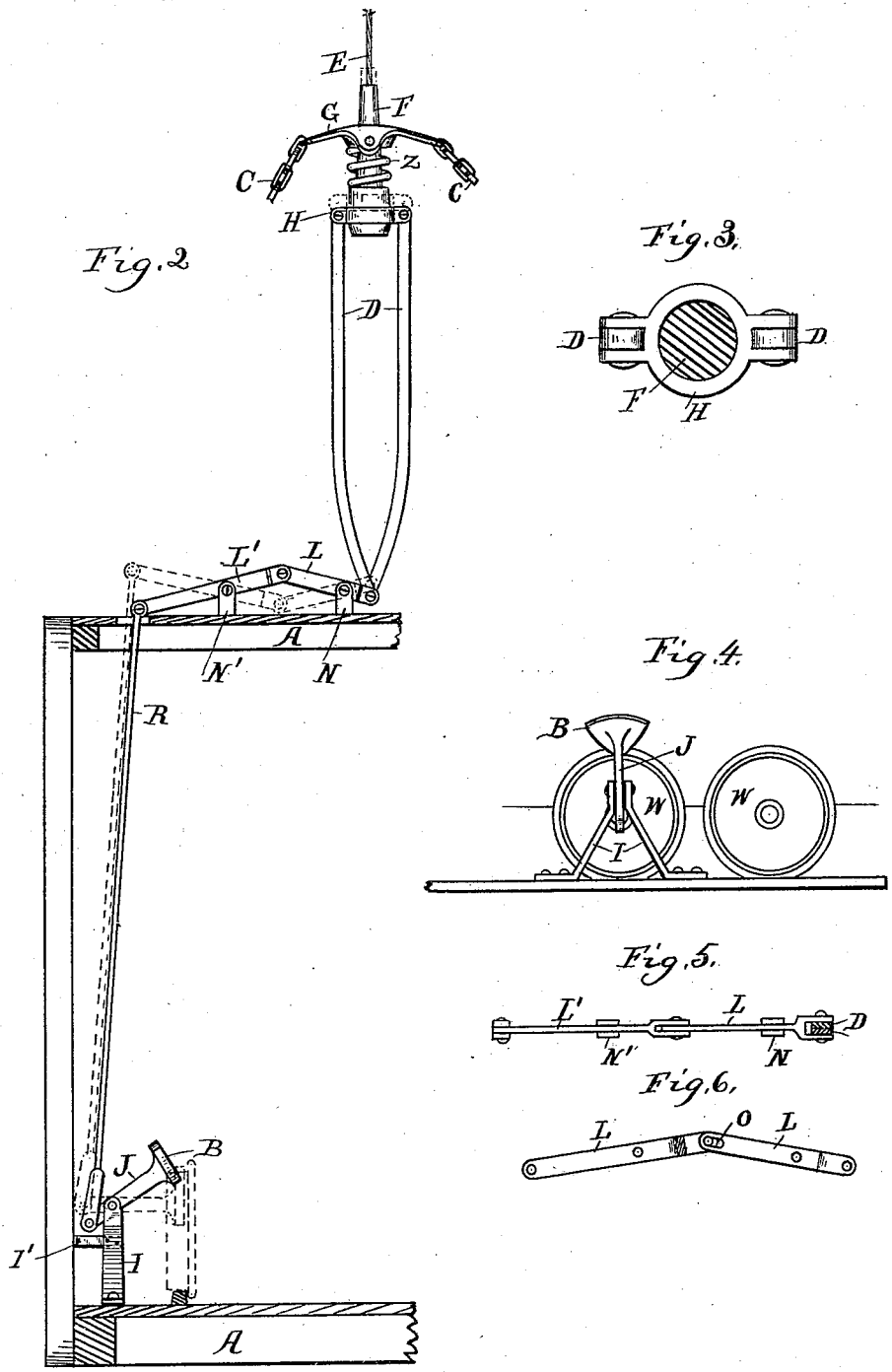

GEORGE H. RAMSAY, OF EXCELSIOR MINES, IOWA.

MINING-CAGE.

SPECIFICATION forming part of Letters Patent No. 356,208, dated January 18, 1887.

Application filed August 9, 1886. Serial No. 210,415. (No model.)

*To all whom it may concern:*

Be it known that I, GEORGE H. RAMSAY, a citizen of the United States of America, residing at Excelsior Mines, in the county of Mahaska and State of Iowa, have invented certain new and useful Improvements in Mining-Cages, of which the following is a specification, reference being had therein to the accompanying drawings.

This invention relates to certain improvements in "mining-cages" for elevating mining-cars; and it consists in a device for holding the said cars in the cage while being elevated from a mine or while being lowered into a mine, and is designed to be used in a coal-shaft, the construction and operation of which are fully set forth and explained in the following specification and claims, reference being had to the accompanying drawings, and the letters and figures marked thereon, which form a part of this specification, in which—

Figure 1 is a perspective view showing a coal-mining cage having the device for holding a mining-car therein attached thereto and in service. Fig. 2 is a vertical sectional view of a portion of a mining-cage and an elevated plan of the device for holding the mining-cars in the cage. Fig. 3 is a plan view of a collar of the device. Fig. 4 is a detailed view showing the manner in which the wheel of a mining-car passes under the holding-head of the device when being entered into or removed from the cage; and Figs. 5 and 6 are detailed views showing the lever mechanism, which is secured to the top of the cage.

Referring to the drawings, A represents a coal-mining cage for elevating and lowering coal-mining cars, &c., in a coal-shaft, and to which is attached the device for properly holding the said cars seated in the cage.

P represents a coal-mining car having the truck-wheels W W, and is run into and on the floor of said cage on a suitable track, as shown in Fig. 1.

C represents the draft-chains of said cage, attached to the four top corners thereof at their lower end and to a center plate, G, at their upper end, as shown in said figure.

F represents a shank, within which is secured the hoisting-cable E, and is arranged through a central hole in plate G, as shown in Figs. 1 and 2. The lower part of shank F is provided or formed with an annular extending flange, upon which is seated the collar H, by passing said shank through said collar, as shown in Figs. 1, 2, and 3.

Sleeved upon shank S, and arranged between collar H and plate G, is a heavy coil-spring, Z, (see Fig. 2,) and is for the purpose of preventing too great shock to the cage A when it first starts to elevate, as the shank F will, when the hoisting-cable E is first started, pass through said plate G a short distance, and not bring chains C into active service until spring Z is compressed.

Collar H has formed integral therewith and oppositely arranged two pairs of ear-lugs, between which are secured a pair of depending links, D, as shown in Figs. 1, 2, and 3.

L and L' represent a pair of levers, pivotally secured to the top of cage A in standard-boxes N and N', respectively, as shown in Figs. 1, 2, and 5, and connected together by placing the end of lever L, having the elongated hole or slot O, within the forked end of lever L', and pivotally securing them, as shown in Figs. 1, 2, 5, and 6, and to the short end of lever L, and between its forks, are pivotally secured the lower end of links D. (See Figs. 1, 2, and 5.)

J represents a lever, fulcrumed at one side from its center in a standard-box, I, which is secured to the floor of the cage A, at one side of said cage, as shown in Figs. 1, 2, and 4, and is connected with the long end of lever L', through the medium of the connecting-link R, as shown in Figs. 1 and 2.

Standard-box I, being of considerable height, is braced to the side of the cage by braces, (shown at I' in Fig. 2.)

B represents a brake-block, formed or secured upon the free end of lever J, as shown in Figs. 1, 2, and 4, and is for the purpose of engaging and holding the truck-wheels of a mining-car, P, to properly hold said car and its load properly seated in the cage A, and as said head is secured to the stationary box I, it will, when held between the wheels W W of the car, prevent the car from movement on its track in either direction, as shown in Fig. 1.

The cage A is designed to be used in a coal-shaft, and S and S represent the shaft-guides between which it travels.

The principal feature of this invention consists in the lever J and the brake-block B arranged or secured thereon, and the mechanism for operating it, for properly holding the cars P seated in the cage while the cage is in operation.

The operation of this device is substantially as follows: The cage A is elevated by means of the hoisting cable E, which is secured in shank F, which shank is arranged through plate G, in such manner that coil-spring Z, which is sleeved on said shank, will be immediately under plate G. While the cage is being elevated, the spring Z is compressed, and the weight of the cage will be upon the draft-chains C; but when the cable E is first started, it will give shank F a limited movement through plate G until the spring Z is compressed, and by that means the links D, which are secured to collar H of shank F, will be operated upwardly, and thus operate and hold down the brake-block B of lever J, through the medium of levers L and L' and connecting-link R, and when a mining-car is in the cage said brake-block B will be seated between the truck-wheels thereof, as shown in Fig. 1, as said head is arranged properly for that purpose, and so long as strain is upon cable E said brake-block B will remain between the said car-wheels, and thus securely hold the car properly seated in the cage and thoroughly prevent it from moving out of place while being elevated. The instant the cage is stopped at rest, at either the bottom or top of the shaft, and the strain is relieved from cable E, the weight of shank F, chains C, and the links of the device will hold the brake-block B disengaged from the car-wheels, so the said car may be free to be run out of or into the cage, and as the two under sides of said brake-block B are inclined or beveled the car-wheel which passes under it, in being placed into or taken from the cage, will force up and pass under said brake-block in the manner shown in Fig. 4, provided said brake-block is not otherwise held high enough, and thus it will be seen that the starting and stopping of the cage automatically operates the device for holding the mining-cars in the cage, and is entirely out of the way of the cars, and requires no attention whatever in its operation, and it can also be attached to any elevating-cage, to operate in substantially the manner shown and described.

The dotted lines in Fig. 2 represent the position of the holding device when in service elevating a car, and the full lines of said figure represent the position of said parts when the cage is at rest.

Having thus described my invention, what I claim as new, and desire to secure by Letters Patent, is as follows, to wit:

1. In a mining-cage for elevating mining-cars, and in combination with the hoisting-cable E and shank F, having means for securing a pair of depending links thereto, the links D, levers L and L', connecting-link R, and lever J, having arranged thereon the brake-block B and adapted to be automatically operated by said hoisting-cable in such manner that said brake-block will engage the wheels of a mining-car to hold the said car seated in the cage, substantially as set forth.

2. In the mining-cage shown and described, the brake-block B, having the lever J, in combination with link R, levers L L', links D, and the hoisting-cables, substantially as and for the purpose set forth.

GEORGE H. RAMSAY.

Witnesses:
F. P. BUCK,
A. H. MURPHY.